United States Patent [19]

Haas et al.

[11] 3,890,460

[45] June 17, 1975

[54] COMMUNICATIONS ENABLING METHOD AND APPARATUS

[75] Inventors: Lee C. Haas; Lynn Parker West, both of Raleigh, N.C.

[73] Assignee: International Business Machines Corporation, Armonk, N.Y.

[22] Filed: Dec. 26, 1973

[21] Appl. No.: 428,166

[52] U.S. Cl. .............................. 178/2 C; 340/147 G

[51] Int. Cl. ........................ H04q 5/00; H04e 11/00

[58] Field of Search ...... 340/147 G, 147 LP, 147 T, 340/147 R, 163, 172.5; 178/2 R, 2 C, 2 D, 2 E, 3, 4.1 B; 179/2 DP

[56] References Cited

UNITED STATES PATENTS 3,644,894 2/1972 McCrea .............................. 340/163

*Primary Examiner*—Thomas A. Robinson
*Attorney, Agent, or Firm*—Edward H. Duffield

[57] ABSTRACT

A communications enabling method and apparatus are disclosed in which the mean response time for the receipt of service from a central station at any one of a plurality of remote stations on a duplex communications channel network is reduced. The method and apparatus are designed to enable entire populations of remote stations or terminals, which potentially are awaiting service and have messages or data to transmit to use the channel. If only one response is received from such an enabling technique, the data is taken and the population is re-enabled. If more than one response is received and the responses conflict with one another, a re-enable sequence is conducted for some lesser plurality or sub group of the entire population until the contending responses are eliminated. The technique utilized is a partitioned search which eliminates contending stations in a rapid and effective manner.

15 Claims, 9 Drawing Figures

PATENTED JUN 17 1975

3,890,460

SHEET 3

COMMUNICATIONS ENABLING METHOD AND APPARATUS

FIELD OF THE INVENTION

This invention relates generally to communications systems control techniques and apparatus and specifically to networks having a plurality of remote stations in which a plurality of remote stations or terminals connected on the network desire to communicate with a central or master station.

PRIOR ART

Numerous communications system control techniques and apparatus have been developed in the prior art. These have generally been directed towards enabling or polling methods and apparatus where a central station controls and/or solicits responses from one or more of a plurality of remote stations connected or connectable via a communications network to the central station. At the outset, characterizing the communications channel as a data link, the prior art is generally concerned with data link control. In such embodiments, "enabling" as a physical act is herein noted as being significantly different from "polling", which conventionally implies that a poll character is sent to some specific terminal or station which forces or solicits some response from that terminal only, i.e., a text message from the terminal, if one is available, and a negative acknowledgement if no response is available. In the prior art, inventors have not generally called attention to this difference. Enabling, on the other hand, solicits text or data messages if available from a specific terminal or station, but a terminal or station with no data or traffic produces no response. Enabling type systems have traditionally operated in a sequence of enable, wait, and enable again following either a specified time lapse in which no message or response is received or following the full receipt of a response, whichever condition applies. Polling on the other hand, has developed along two lines in which either a particular station is polled and a response is awaited and received which indicates either data or no data, or a plurality of stations are polled and are allowed to resolve any contentions among themselves until only one station responds. Prior enabling techniques are described in U.S. Pat. Nos. 3,755,781 and 3,755,782 although the word "polling" is used in those patents. In U.S. Pat. Nos. 3,755,781 and 3,755,782, only stations having data to send respond to the "poll" and, when contention exists, a "repolling" is conducted as in U.S. Pat. Nos. 3,755,781 & 3,755,782 or the stations enter a priority contention routine in which the station having the highest priority gains access to the channel as is shown, for example, in U.S. application Ser. No. 342,239 and for example in British patent 1,168,476 which discloses another variant of the general interstation priority contention system. Improvements have also occurred in generalized enabling systems specifically adapted for the control of loop communications systems as exemplified by U.S. Pat. Nos. 3,632,881 and 3,594,549.

The present invention is an enabling type of system in which one or more stations are enabled and a response therefrom is awaited. Contention among the stations is purposely invited and, when contention occurs, it must be resolved. In the previously mentioned U.S. Pat. Nos. 3,755,781 and 3,755,782, the resolution of contention was achieved by re-enabling, or "repolling"as termed therein, each station appearing on a list of possible contenders which was generated and maintained in a central control until the contending stations were separated. In the present invention, no lists of possible contending stations are maintained nor is re-enabling conducted, in a usual case, individually. The invention generally may be characterized as consisting of an enabling routine in which entire blocks or populations of terminals are enabled and, in the event that contention results, successively smaller sub groups or blocks of terminals are enabled until the contention is eliminated.

The prior art conventional enabling techniques have a generally high mean response time for service at any one of a plurality of stations. This is particularly true when such techniques as time division multiplexing are applied to communications systems where a large number of potentially active terminals are connected to a single channel. It is also true for conventional polling techniques in which individual stations are polled and a response is awaited since the time required in awaiting responses from inactive terminals grows excessively large where the number of terminals is great and the number of those terminals simultaneously requiring access to the communications channel is small. The aforementioned U.S. Pat. Nos. 3,755,781 and 3,755,782 relating to a contention resolution scheme in a technique, which fits the above defined "enabling" type, are generally superior where the message error rate or noise (which creates the effect of errors) climbs above $10^{-1}$ errors as a fraction of total bits transmitted; but as detailed therein, event that system can degrade to low performance where very high noise and error rate conditions are encountered. Where noise and error rates are chiefly of the burst or intermittant type, such as in radio operation, the aforementioned techniques are indeed superior since the bit error rates are generally high as compared with those experienced on a common carrier or better grade communications network, but not too high to allow the use of the patented techniques mentioned. The present enabling technique becomes superior whenever the error rate is less than $10^{-1}$ errors as a fraction of total bits per unit of time transmitted.

The main difficulties with the prior art may therefore be characterized in that enabling schemes involve generally longer mean response times for a waiting station to gain access to the central station over the communications channel than are acceptable. This is particularly true where it is desirable to connect a very large number, (say 100 or more) of terminals to a given station. Polling techniques generally suffer from the same shortcomings except that they can be adapted, as taught in the above-mentioned patents, to be more effective under high noise conditions and to provide lower mean service response times than enabling schemes in general. The present invention finds its utility as an improved enabling scheme of maximum benefit in reducing mean response time where higher numbers of stations are connected in a low-noise channel, such as a common carrier network, to a central station and in which the probability that any given station has data to send is relatively low. The present method and apparatus are superior to the prior polling and enabling techniques in this environment and provide lower mean response times for service than any of those previously known in this type of environment. Under low noise, high terminal population, and low individual usage conditions, the present invention is superior in providing low mean response times.

OBJECTS OF THE INVENTION

It is an object of this invention to provide an improved data link control method and apparatus which provides shorter mean response times in granting access to a central station from a specific terminal or remote station than those previously known in centralized multipoint inquiry/response teleprocessing systems.

It is a further object of this invention to provide a method and apparatus of improved design which can alternatively either reduce the mean response time for service for a given terminal or station below that required by the known prior art systems having a similar number of remote terminals or which can, by matching the prior art mean response time, service a great deal larger number of terminals than the prior art under low noise or error conditions.

SUMMARY OF THE INVENTION

The foregoing and other objects of the invention are met by openly inviting contention among a plurality of remote terminals by enabling a relatively large number of them to respond and by resolving contention in the event it occurs by enabling successively smaller pluralities or sub groups of the originally enabled group until the contention is avoided. The control apparatus may reside at the central station as shown in a preferred embodiment of the invention. The central station, during idle periods on a communications network, enables specified blocks or groups of remote stations to transmit data back to the central where the responses are detected and checked for possible contending responses. In the event of contention, re-enabling for successively smaller sub groups of the originally enabled group is conducted until the contention is eliminated and an uninterrupted message is received from a station.

BRIEF DESCRIPTION OF THE DRAWINGS

At the outset, it will be assumed that all references to the network, channel or communications line or data link herein contemplate the use of a typical commercial common carrier or better grade of network where the bit error rate as a function of total bits transmitted in unit time is $10^{-1}$ or less. It is also assumed that no great discussion need be given for the embodiments of prior art shown in FIG. 1 detailing the general elements of a typical half duplex communications system operating in the multidrop mode. In FIG. 1, central station 1 is connected via a channel 2 to a plurality of stations $S_1$ through $S_n$ which may be also called remote terminals in the usual teleprocessing terminology. The central station 1 comprises, in addition to control logic as will be discussed with reference to the preferred embodiment, transmit and receive function and apparatus for the handling of data as will be discussed further below. These elements are denoted by the T and R boxes respectively in central station 1 of FIG. 1. Although the discussion will be given for a half duplex operation, it is quite obvious that full duplex operation can be easily accommodated using the method of the present invention as will be apparent to those skilled in the art.

Turning now to FIG. 2, a preferred embodiment of the logic and functional control which must be provided within central station 1 of FIG. 1 will be discussed as one preferred embodiment of the apparatus of the present invention. For purposes of simplicity, a discussion of the apparatus shown in FIG. 2 will proceed from the point at which the start of data coming in at the receive port of central station 1 via network 2 commences. The first element in the receiver after the usual filters, amplifiers, and other signal conditioning equipment well-known in the art and not discussed herein, is a detector 3. Detector 3 must perform the function of providing a signal when no energy (an idle condition) or signal is detected on the incoming line, another signal if an incoming message format is detected, and a third signal in the event that more than one message, or a potentially contending condition between two or more incoming messages, or noise and a message is found to exist. In the first instance, during idle, a signal will be outputted on line 4 and AND gate 5 as shown. In the event that an incoming message is detected by detector 3, the signal will be outputted over line 6 and AND gate 7. In the event that contention, which may consist of conflict between an inbound message and noise on a network is detected in detector 3, a signal will be outputted over line 8 to a contention latch 9 and to OR gate 10 as shown. The output of contention latch 9 is applied to condition one leg of AND gate 7, the other leg of which is conditioned by the message output from detector 3 over line 6 as previously noted. Contention latch 9 sets a switch which maintains the leg of AND gate 94 conditioned thereby in its on condition until it is reset by a signal from line 11 which will be discussed later. In the event that contention is detected in detector 3 at the same time that a message is also detected, AND gate 7 will actuate to provide an output signal to the message counter decoder 12 and to AND gate 13. Message counter decode 12 provides one of two different signals depending on whether two or more messages or less than two messages have been counted. In the event that less than two messages (0 or 1 message) have been detected and counted by message counter 12 since a reset, a signal is provided over line 14 to AND gate 13 to condition one leg thereof.

Figure 1:
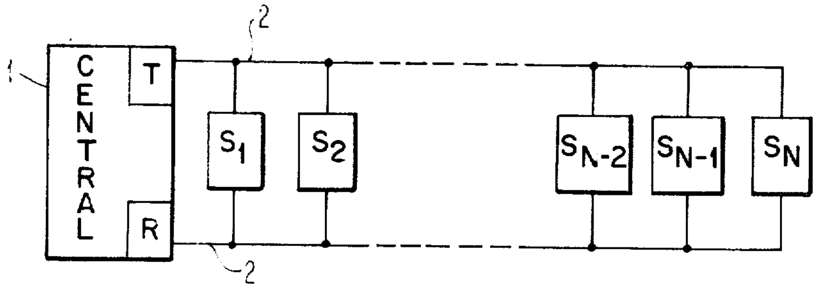
FIG. 1 PRIOR ART
FIG. 1 illustrates a generalized schematic form of the well-known half duplex or multidrop communications network.

The other leg of AND gate 13 is conditioned by the output of AND gate 7 which is indicative, when on, of contention having existed since partitioning began, and of a message presently arriving. An output from AND gate 13 is applied to OR gate 15 which produces a signal when either leg thereof is conditioned which signal is applied to OR gate 16 and to the address set decoder 17. Address set decoder 17 will provide an output to change the address bit of the previous lowest set mask bit in address register 18 as will be discussed later. The output of OR gate 16, which gate is activated by an output from OR gate 15, conditions one leg of AND gate 19.

If message counter decoder 12 registers a count of two or more messages, an output on line 20 is provided to condition OR gate 21 which in turn provides a reset signal 22. The reset signal 22 is applied to address register 18 to set it to its initial or starting condition as will be discussed later and to mask register 23 to reset it to a start condition as will be described later. The reset signal is also applied to the contention latch 9 via line 11 and to the message counter decoder 12 as shown. Although the preferred implementation uses this message counter 12 to inhibit further partitioning after two messages have been received, the message counter decode 12 could be implemented to inhibit partitioning after some other number, up to the entire population of terminals, has been counted. For example, if lower noise or error rates are expected due to the characteristics of the particular channel used, the decoder could be set to a higher number since the probability of noise or error masquerading as contention would be lower. As will be obvious to those skilled in the art, lower noise and error implies that any contention detected is really contention. The decode count can be adjusted at will to suit the expected or actual channel conditions.

If contention only is detected by detector 3, the output over line 8 through OR gate 10 to condition OR gate 16 and to set the mask bit decoder 24 to set the highest previously unset mask bit is given as will be described later. The same effect is also provided by an output from AND gate 5 for the condition of no received tone with contention having been previously detected, which also operates through OR gate 15 and 16 and which also is applied to change the address bit of the previous lowest set mask bit in the address decoder 17.

The mode control block 25 determines whether the mode switch 26 will be set to send text, enabling commands, or an idle tone. The scan control block 27 steps the scanning switch 28 to connect the enabling command register 29 to either a mask register 23 or the address register 18. Both the scan control 27 and the mode control 25 will be discussed later as will further details of detector 3.

Figure 2:
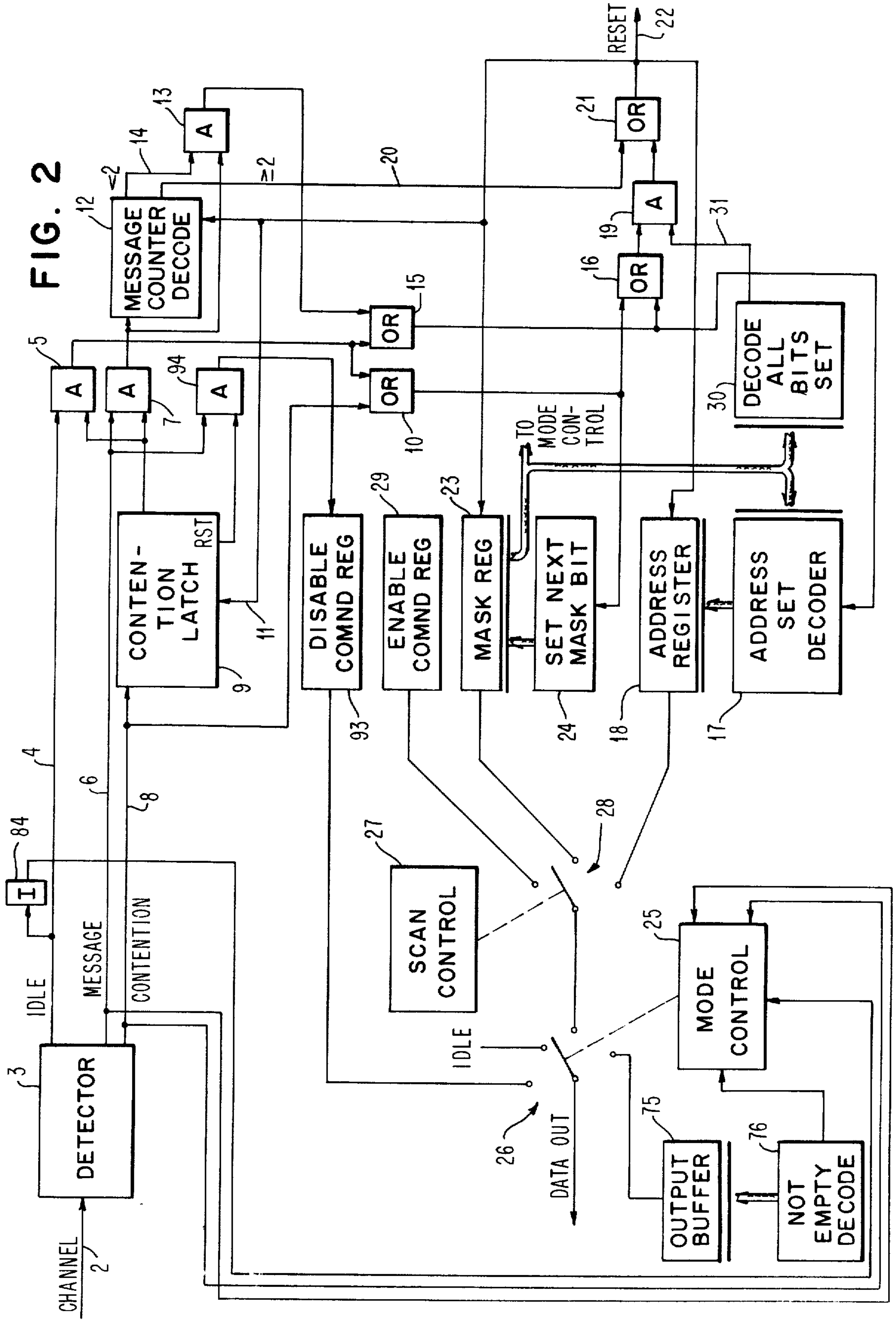
FIG. 2 illustrates in schematic form the primary logic and functional units of the central station for use in a system such as shown in FIG. 1.

The general operation of the central station illustrated in FIG. 2 is as follows: in normal operation, the central station continuously operates either by enabling all or some sub group of the terminals $S_i$ through $S_k$ or by receiving messages from one of said terminals. Assuming that no messages are being received, the central station enters an enable mode by first sending an ENABLE character, folowed by a bit sequence 0000000 which is followed by a bit sequence of XXXXXXX. Note: a 7 bit character format is utilized in the preferred embodiment and in the description, it being well-understood that any chosen format or bit pattern can be equally well utilized. X's denote either one's or zero's and can be taken as any bit. The ENABLE character alerts all terminals $S_i$ connected via the data link 2 to the central station 1 to examine the subsequent mask character, 0000000, to see which bits, if any, in the second character are set to zero. In this example, all bits are set to zero. The third character is utilized as a control word which will be the determining factor for enabling various terminals $S_i$ to activate. In the example given, the mask is all zeros, which means that all terminals are enabled by the enable sequence. For an enable sequence with all zero's mask, any terminal receiving the enable character may transmit any message then ready to transmit, or may transmit any message readied thereafter, as that message becomes ready. If the central 1 detects contention in response to this sequence, the central will respond by disabling all terminals not sending, and then will transmit the ENABLE character, followed by a mask character of 1000000 followed by an address character of 0XXXXXX. For an enable sequence with a mask that is not all zero's, only terminals with messages to transmit at the time the enable character is received may transmit. Not all of these terminals will usually transmit, however. In this example, only the first bit in the mask character is set to one, so all terminals examine only the first bit of the address character. Here the first bit of the address charcter is a binary zero, so all terminals having a first address bit of zero will be enabled. No other terminals may respond.

It should be understood that all stations $S_i$ have individual 7 bit addresses to identify themselves in this particular example as is well-known to those of skill in the art. Similarly, too, the technique for comparison of an incoming control word against a terminal's address to activate a latch or switch is a well-known function in the art and will not be described further. Any terminal $S_i$ having a zero in its first bit of its address, as stated previously, is enabled. In the usual case, no more than one such station will have traffic to transmit in the assumed environment in which this invention is described because the probability of usage for the traffic density for each terminal is assumed to be quite low, for example less than 0.5% probability that at any specific time the given terminal $S_i$ will have traffic for transmission.

If, however, this second enable sequence results in contention, the central will transmit an enable sequence in which the mask is 1100000 and the address character is 00XXXXX. This sequence will enable only terminals which contain zeros in the first two address bit positions. Normally the central station 1 will recieve the transmission from terminal $S_i$ and will transmit another full enable sequence. Central station 1 will continue to partition in this way the terminal population for each enable sequence which results in contention. Eventually, an enable sequence will result in reception of a message or silence.

If a message is received, the message is accepted and the enable sequence is again transmitted. The mask transmitted is identical to the mask of the previous transmission, but the lowest activated address bit will be changed. For example, if partitioning by contention has resulted in a message response to mask 1111000 and address 0000XXX, the next enable sequence will contain a mask of 1111000 and an address of 0001XXX. This enables the remaining set of those terminals which were previously contending with the one from which the message has been accepted.

If partitioning eventually results in silence, the next enabling sequence enables a partition at all those terminals which were last known to have been involved in the contention but which were not enabled by the command which resulted in silence.

For example, if successive contentions have occurred for successive partitions including contention in response to a mask of 1110000 and an address of 000XXXX, then all terminals having the first three bits set to zero are involved in contention and are called a contention group. The next enable sequence contains a mask of 1111000 and an address of 0000XXX. If silence (idle) results from this transmission, all terminals with addresses of 0000XXX have no traffic. From the previous contention group, then, contention would result if a mask of 1111000 and address of 0001XXX were transmitted by the central.

In response to silence during partitioning to resolve contention, the central therefore enables only half the remaining terminals in the last known contention group which are not part of a silence group. For a partition in which the last mask has $n$ bits set to one, the $n^{th}$ address bit is inverted and next enable sequence will be transmitted with $n+1$ mask bits set to one. In the example here, a mask of 1111000 and address of 0000XXX result in silence. The next enable sequence will contain a mask of 1111100 and an address of 00010XX If silence occurs again, the next mask will be 1111110 and the next address will be 000110X. If, instead, contention occurs, the next mask will be 1111110 and the next address will be 000100X.

The third possibility is that a message is received. If this is the first message received since partitioning began, the next mask will have the same n bits set, and the lowest activated address bit will be inverted. Here, the mask will be 1111100 as sent previously, and the address will be 00011XX. If this is the second message received since partitioning began, the mask register 23 is reset, the contention latch 9 is reset, the message counter 12 is reset, and the address register 18 is reset. The next enable will be a full enable, and partitioning will be discontinued until contention occurs again.

If partitioning ever results in a condition where all bits of the mask are set, one enable sequence containing this mask is sent. Regardless of the result, the registers, counters, and latch (23, 9, 12, 18) above are reset.

For initial operation, the contents of the mask bit register 23 and the address register 18 are all zero. Any terminals $S_i$ receiving an enable sequence with all zero's, or as described above with a zero in the first bit of their address, will send traffic to the central station 1. If the detector 3 detects that contention exists, i.e., if more than one station $S_i$ has traffic to send, the contention latch 9 will be set. Otherwise, messages are accepted from the various stations and operation continues as described above.

If contention is detected by detector 3, and latch 9 is set, the first mask bit in mask register 23 will be set to a one by the operation of the mask bit decoder 24 conditioned as shown by the output from OR gate 10 conditioned in turn by the output from detector 3 over line 8. The subsequent operation of the system is that, for each detection of contention, the mask register content is changed by one bit to permit an additional level of discrimination in the enabling sequence as will be clear in the example that follows. Each received idle signal will change the address bit corresponding to the lowest set mask bit of the previous enable cycle and will also set the next lower mask bit. The first subsequent received message will set the message counter 12 to one and in addition will change the address bit corresponding to the lowest set mask bit of the previous cycle. After a second message is received, or after a search is completed down to the lowest address bit, address register 18 and mask register 23 as well as contention latch 9 and message counter 12 are reset and the enabling cycle once again returns to the operation of enabling all terminals.

In the event that all of the bits in address register 18 or in mask register 23 have been set, the all bit set decoder 30 will provide a signal over line 31 to condition the other leg of AND gate 19 which, through OR gate 21 will provide reset signal 22 to provide the aforementioned return to the enabling sequence just described.

As described above, two or more terminals $S_i$ may occasionally develop traffic at the same time for transmission. If this happens, and if both said terminals possess, for purposes of discussion, a one bit in their first address position, then both will be enabled simultaneously by the enable sequence, ENABLE, 1000000 and 1XXXXXX and both will begin to transmit in interference with each other. This fact will be detected as contention in detector 3 and, after both conflicting transmissions have ceased, central 1 will send a new enable sequence, enable 1100000 and 10XXXXX and the two terminals will interfere only if both have a one zero in the first two positions of their addresses. In the event that both such terminals do have one zero in the first two positions of their addresses, after transmission has ended, the central will send again, enable 1110000 and 100XXXX so that contention will occur only if the two terminal addresses agree in the first three bit positions. The process continues in the worst case, to separate two contending terminals with seven bit addressing, a total of 128 possible terminals, until 7 enable sequences have been sent.

There are alternative implementations of this type of search algorithm. For a seven bit assumed address scheme, the central station 1 could send an enable by a ten bit word, the first three bits of which could be coded to indicate which address bits in the terminal are to be sensitized according to some code as follows: 011 the first bit in the address will be examined; 010 the first two bits must be checked against the control word; 011 the first three bits are to be checked against the control bit; 100 the first four bits, etc.

Figure 3:
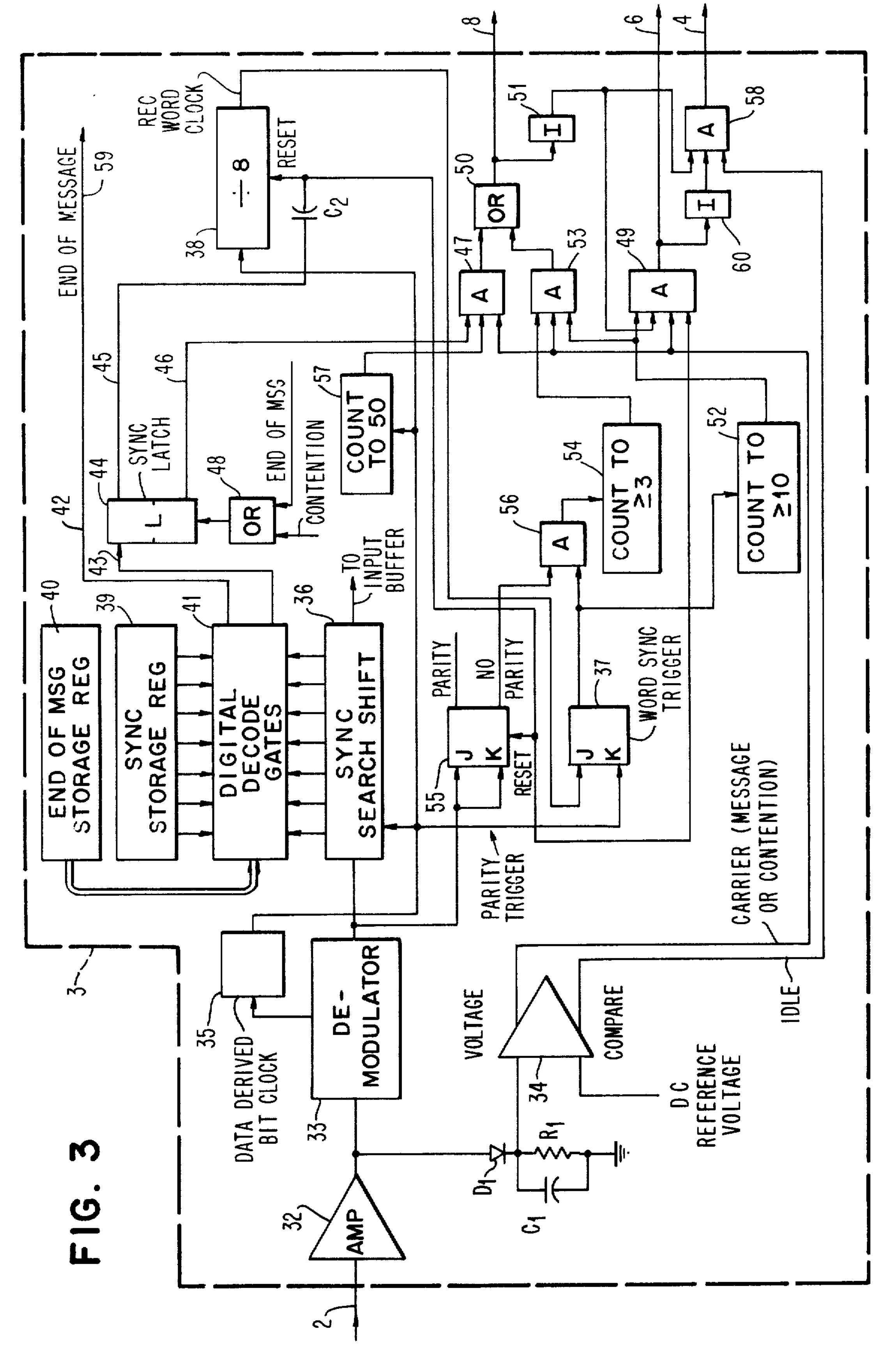
FIG. 3 illustrates in schematic form the logic and functional operation of the detector shown in FIG. 2.

Turning now to FIG. 3, a more detailed description of detector 3 of FIG. 2 will be given. Input from line 2 is applied forst to the amplifier 32 the output of which is applied to demodulator 33 and to the filter network consisting of diode D1, capacitor C1 and resistor R1 which are conected to ground. The filtered output from the filter network is applied to the input of a voltage comparator 34 so that one half of the AC input signal amplified by amplifier 32 may be compared in a DC reference voltage applied to the other input of voltage comparator 34. Voltage comparator 34 serves the purpose of determining whether a carrier line voltage, indicative of a received signal or of noise, is present.

Demodulator 33 receives the amplified signal from amplifier 32 and drives a data derived bit clock 35 which produces a clock pulse for each data bit coming from demodulator 33. The signals stripped from the carrier frequencey in demodulator 33 are also applied to the input of a sync search shift register 36 which continuously monitors the flow of data bits coming from the demodulator 33. The data derived bit clock 35 provides shifting pulses for the shift register 36 and is utilized to provide synchronizing pulses to a JK flip-flop acting as a word synchronization trigger 37 and to receive word clock 38. Receive word clock 38 is simply a divide-by-eight register, well-known in the art, which generates an output once every eight bits assuming that eight bit word format is used, but a divide-by-four, divide-by-sixteen, etc., receive word clock would be utilized in other data formats as is well-known in the art.

The content of the sync search shift register 36 is continuously monitored and compared against the content of a sync storage pattern register 39 and against an end of message storage register 40 by a set of digital decoding gates 41 which produce output signals on lines 42 and 43 whenever the pattern of bits in the sync search shift register 36 matches either the sync register pattern stored in the register 39 or the end of message pattern stored in register 40.

When synchronization is detected by the correspondence between the content of register 36 and register 39, the output on line 43 is applied to sync latch 44. The sync output line 45 is applied through capacitor C2 to reset the receive word clock 38 so it will start counting from zero as will be well-understood to be a requisite if eight bit words are to be accurately formatted. If synchronization is not detected, a no sync signal over line 46 will be applied to AND gate 47 to condition one leg thereof.

An end of message detection in decoder 1 produced by the correspondence between end of message pattern as seen in storage register 40 and the content of register 36 produces an end of message signal on line 42 which is applied, among other places, to the input of OR gate 48 to provide a reset signal to the sync latch 44. The detection of contention is also applied to OR gate 48 to cause the reset of sync latch 44 as will appear later.

In the event that synchronization is detected, the content of register 36 will be applied to a data input buffer, not shown.

The operation of the overall detector in FIG. 3 may be characterized as follows: a message signal at 6 is produced whenever AND gate 49 is conditioned by an input from the sync latch 38, a signal level indicative of non-idle from voltage comparator 34, the absence of a contention signal from contention OR gate 50 inverted through inverter 51 to produce an up level at the input of AND gate 49 and, an output from the word synchronization trigger counter 52 which produces a signal whenever the word synchronization trigger has detected at least ten synchronized received words. The significance of at least ten received words is that in an assumed message format a sequence of ten terminal address characters of seven bits each plus parity bit for eight bits would be sent in a normal transmission scheme, for example. Other start-up sequences and conventions are equally applicable and in that event, counter 52 would count some other number than ten.

The output of counter 52 is also applied to AND gate 53 to condition one leg thereof. Another leg of AND gate 53 is conditioned by the carrier voltage signal from voltage comparator 34. The final leg of AND gate 53 is conditioned by the output from counter 54 which produces a count indication whenever its input has counted at least three signals produced by a coincidence of both a word synchronization pulse from sync trigger 37 and a lack of parity from parity trigger 55 operating through AND gate 56. That is, counter 54, upon detecting three synchronized word which lack parity which could be caused either by transmission errors, noise or contention, will produce an output to condition the final leg of AND gate 53. The output from AND gate 53 is provided to an input of OR gate 50 to provide an indication of contention existing which is an output for detector 3 on line 8.

Contention also will be produced if the other leg of OR gate 50 is conditioned by an output from AND gate 47. This happens whenever the voltage comparator 34 conditions one input of AND gate 47, the lack of synchronization is detected on line 46 which is an input to AND gate 47, and a bit counter 57 have counted to an arbitrary 50 bits. The coincidence of these circumstances would indicate that demodulator 33 is detecting bits which produce pulses in the bit clock 35 which is indicative that some form of transmission is being received but that synchronization is lacking so that either contention must exist or a message garbled by noise or other disturbances must exist. The result is equivalent to contention and produces the output on line 8 as shown.

Other outputs from detector 3 are the idle output 4 from AND gate 58 and the end of message or signal 59. Idle signal 4 from AND gate 58 is produced by the coincidence of the detection of the idle tone voltage level by voltage comparator 34, the lack of a message output 6 as detected through inverter 60, and the lack of contention being detected as signalled through inverter 51.

The end of message word decoded by decoder 41 is produced at an output terminal 59 connected to line 42 whenever the end of message character stored in register 40 matches the content of the sync search shift register 36 as detected by decoder 41.

Figure 4:
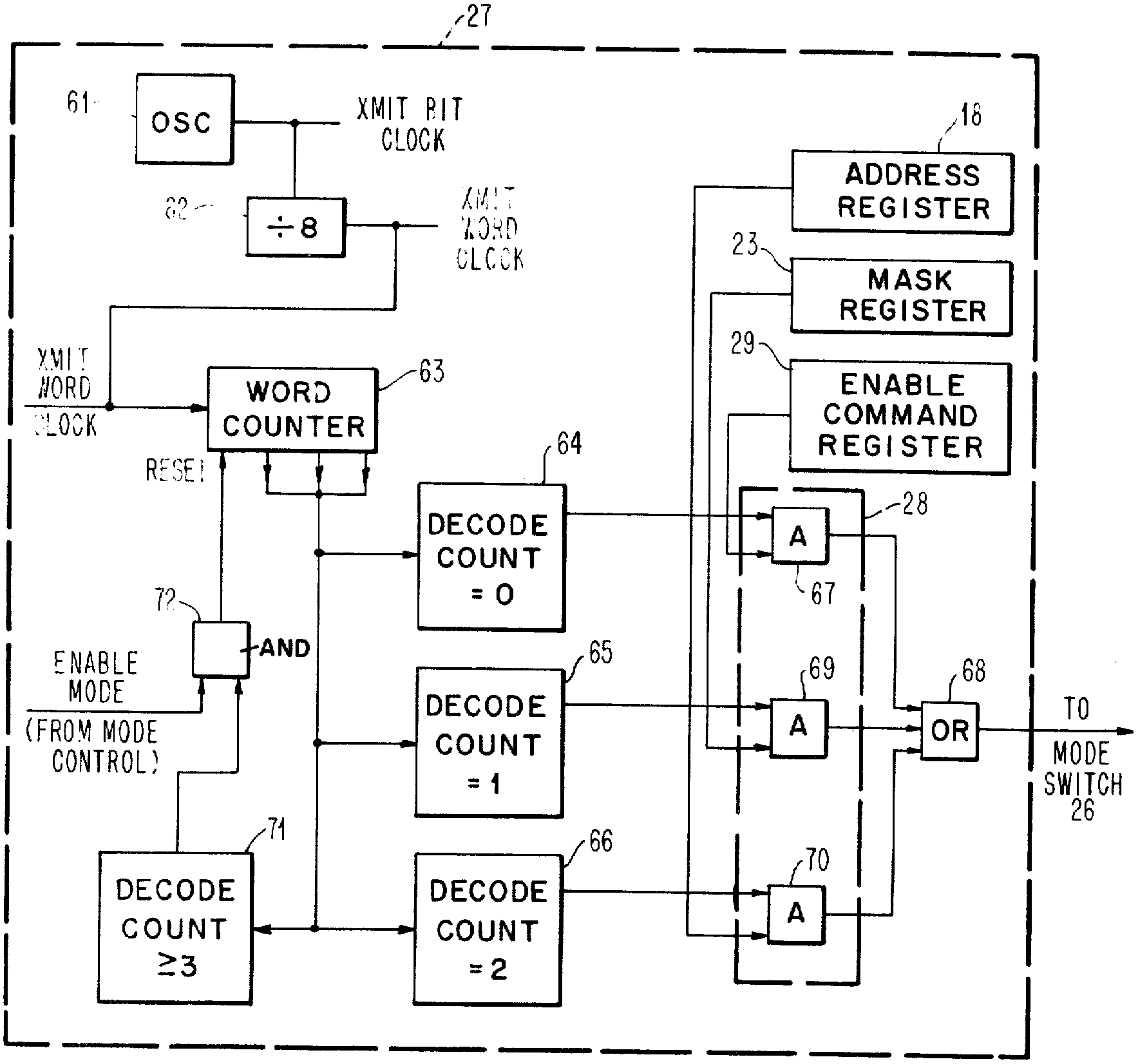
FIG. 4 illustrates in schematic form the function and logic for the scan control illustrated in FIG. 2 in block form.

Turning now to FIG. 4, an embodiment of the scan control mechanism 27 of FIG. 2 will be discussed. The scan controller 27 is a basic sequencer for the entire system and operates from an oscillator or transmit bit clock 61 running at a fixed frequency. The output from oscillator 61 is run through a divide by eight register 62 to produce pulses once every eight bits to format eight bit transmission words. The output of transmission word clock 62 is applied to an input of a word counter 63, the output of which is connected to a zero count decoder 64, a one count decoder 65, and a two count decoder 66. A zero count decode in decoder 64 conditions one leg of AND gate 67 which will cause the contents of the enable command register 29 to be outputted through OR gate 68 through the scan control switch 28 and to the mode control switch 25.

The decode of a count of one in word counter 63 will be produced at the output of decoder 65 and applied to the input of AND gate 69 which causes the content of the mask register 23 to be outputted through OR gate 68 to scan control switch 28.

A decode of a count equal to two in word counter 63 is decoded in decoder 66 to provide an input to AND gate 70 which causes the content of address register 18 to be outputted via OR gate 68 to switch 28.

Whenever the content of word counter 63 is equal to or grater than three, decode counter 71 produces an output to condition one leg of AND gate 72. Whenever the other leg of AND gate 72 is conditioned by the enable mode switch control 25, a signal is applied to reset word counter 63.

The operation of scan control 27 is to continuously cause the sending of enable commands followed by the content presently in the mask register 23, followed by the content of the address register 18 to be examined by the various terminals $S_i$. The transmission is controlled by the mode control switch 25 which steps continuously through idle, data and transmit text positions, as will be discussed next.

Figure 5:
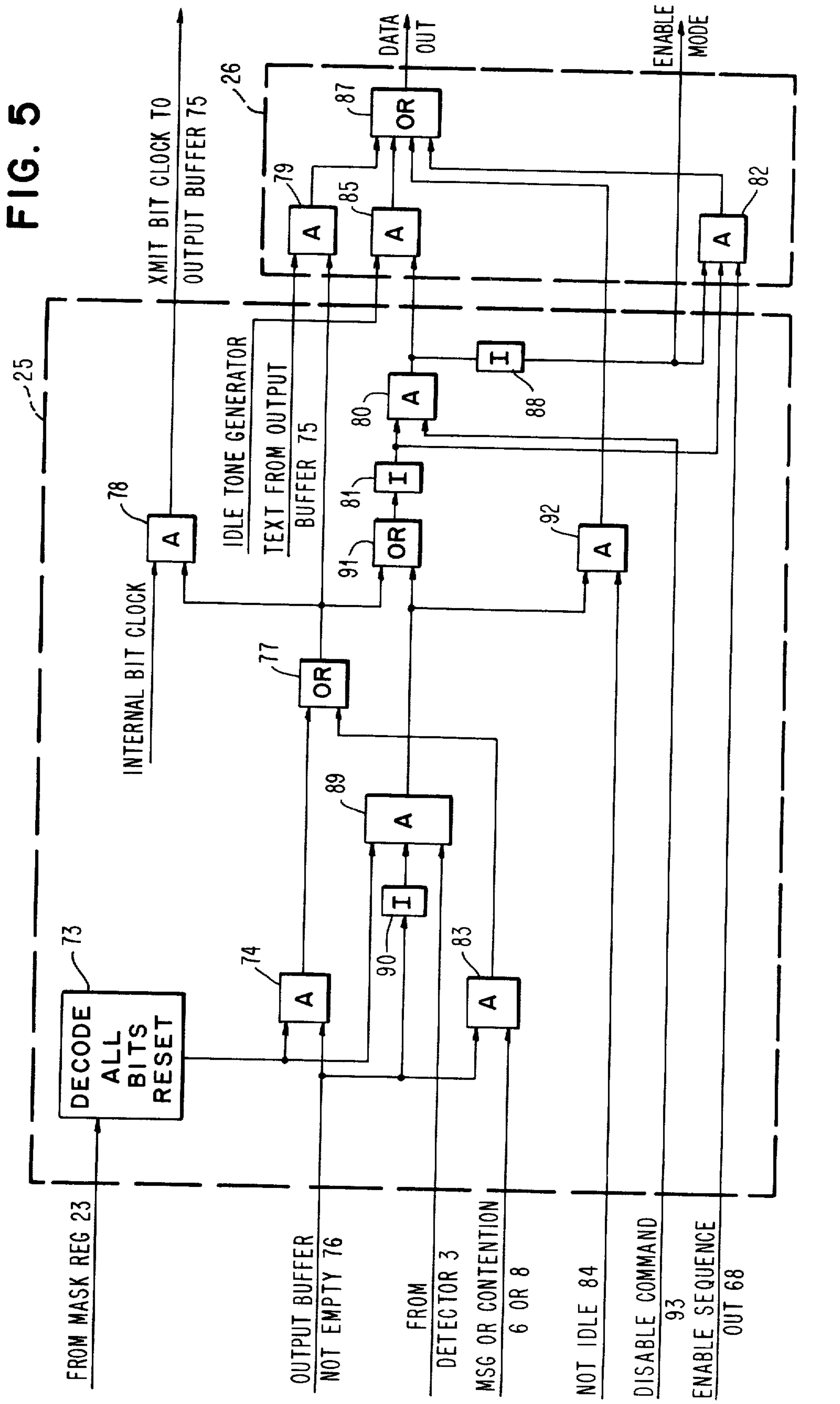
FIG. 5 illustrates in functional and schematic form a mode control illustrated in block form in FIG. 2.

Turning now to FIG. 5, an embodiment of suitable mode control 25 will be discussed. The output from the mask register 23 of FIG. 2 is applied to a decoder which detects the condition of reset in mask register 23. The output of the decoder 73 is applied to the input of AND gate 74. The other leg of AND gate 74 is conditioned by a signal from an output buffer 75 through not empty decoder 76 as shown in FIG. 2. The resulting signal when both conditions occur is outputted from AND gate 74 through OR gate 77 which conditions one leg of AND gate 78, one leg of AND gate 79 and which deconditions one leg of AND gate 80 through inverter 81. It also deconditions a leg of AND gate 82. The presence of a not empty decode from decoder 76 also conditions a leg of AND gate 83, the other leg of which is conditioned by the detection in detector 3 of either a message or contention. The resulting output from AND gate 83 is applied through OR gate 77 to similarly cause conditioning of AND gates 78, 79, and deconditioning of 80 and 82. The lack of idle signal 4, signalled by inverter 84 in FIG. 2 is applied to the other leg of AND gate 80.

AND gate 80 is conditioned when no messages are waiting in the output buffer, but a signal is being received. This effect may be seen to better advantage by viewing the logic of FIG. 5 connected to AND gate 80. The output of AND gate 80 is applied to the input of AND gate 85 which is also conditioned by the output of an idle sequence generator 86 to apply an idle tone through OR gate 87, which is applied through the data out terminal of switch 26 of FIG. 2.

The output of AND gate 80 is also applied to inverter 88 to create the enable mode signal applied to AND gate 72 in FIG. 4 and to apply a signal to enable a leg of AND gate 82. The other leg of AND gate 82 is enabled by a signal from OR gate 68 in FIG. 4 of the scan control so that AND gate 82 when fully conditioned provides an output to OR gate 87 which connects the enable sequence from scan control 27 through switch 28 via switch 26 in FIG. 2.

Figure 6A:
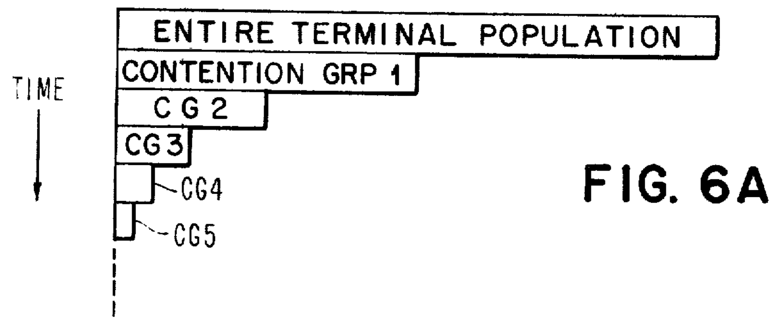
FIG. 6A through 6C illustrate three possible sequences of operation for a system operated according to the method of the present invention.
Figure 6B:
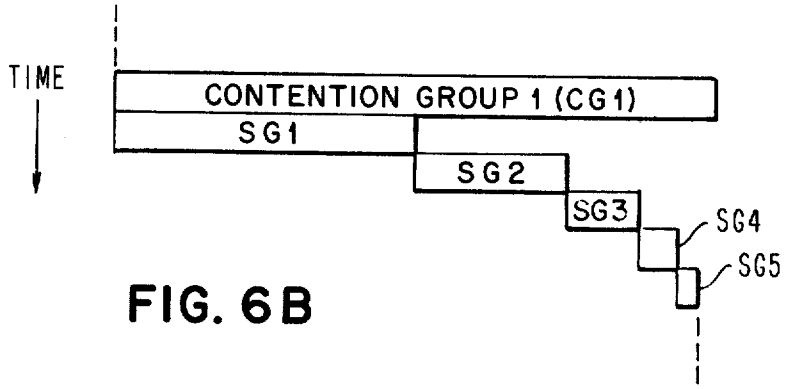
Figure 6C:
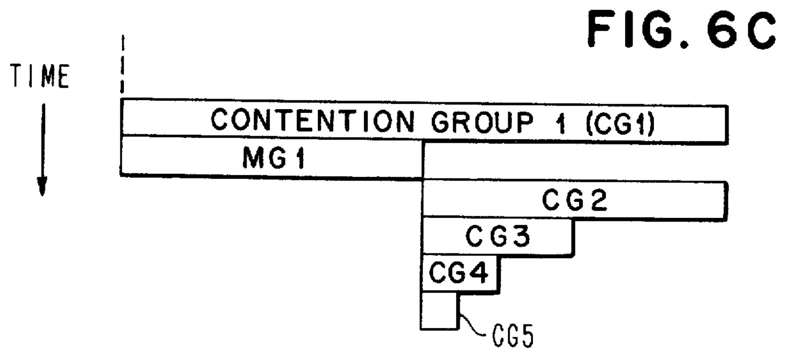

Internal bit clock 61 of FIG. 4 is also applied to an input of AND gate 78 to provide a transmit bit clock output to a text or output buffer 75. Turning now to FIG. 6A through 6C a schematic view of the method of operation of the present apparatus will be explained. In FIG. 6A in decending order from top to bottom are shown in graphic form effects of operating under the present method. First, the entire terminal population may be enabled if all addresses in the terminal population are, arbitrarily, given an initial bit of zero and an initial enabling address begins with zero. If a message is detected and no contention exists, successive enabling signals with continue to be sent and messages received individually without departing from this mode of operation. In the event that contention is detected, the first bit in the address group will be set to a one as previously discussed and contention group one will be enabled as illustrated graphically by the second block in FIG. 6A. Should further contention exist, the system will automatically step through contention group 2, 3, 4, 5, etc., as shown until, in the present example, seven different mask bits will have been changed, the total number possible with seven bit addresses.

FIG. 6B shows in graphical form operation of the system where, after entering contention group 1 of FIG. 6A, and sending the subsequent, further partitioned enable, only silence is detected. In FIG. 6B silence group 1 corresponds to contention group 1 of FIG. 6A but only silence is detected. Silence group 1 is further partitioned by the algorithm set forth in changing one bit at a time in the address block and, in the example shown, results in silence groups 2, 3, 4, etc., as illustrated and depicted by the terminology SG2, SG3, SG4 . . .

FIG. 6C illustrates the condition where, upon contention group 1 being found in FIG. 6A, the next enable results in a received message. This group of terminals is called message group 1. Reception of the message causes an enabling of the terminal population labeled herein CG2 where contention is again detected in this example. Thereafter, successive contentions cause partitioning of CG3, CG4, CG5 . . . In the event that silence is detected in contention group 2, an error must have occurred since message group 1 is assumed to be silent in this example and a restart is necessary. If contention is found in contention group 2, the effect is the same as in FIG. 6A with successive contention and the operation continues until either contention is removed by the successful receipt of a message or silence occurs requiring a restart.

Figure 7:
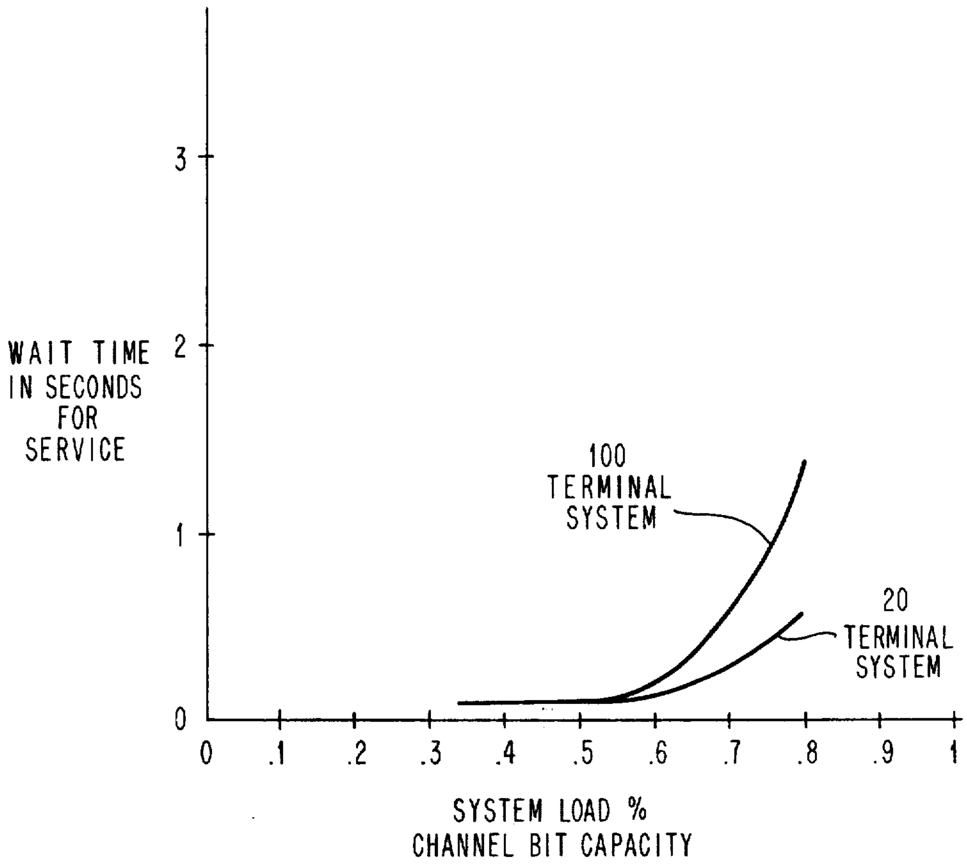
FIG. 7 is a graph illustrating the effect on waiting time for service in seconds as a function of system load as a percentage of total channel capability in percent for a 100 terminal system and a 20 terminal system respectively operated according to the present invention, for a bit rate of 2400 bits per second and a message synchronization time of 50 milliseconds.

Turning to FIG. 7, a graph of the mean waiting time in seconds for service between the time a given terminal $S_i$ requires service and the time at which it will be serviced by the enabling method of the present apparatus is shown versus the system load as a percentage of total channel bit capacity. Two conditions or curves are given, one for a 20 terminal system and another for a 100 terminal system. The curves were generated by simulation of this method using a computer model.

Having thus detailed the apparatus of the present invention in combination with some discussion of the method of operation thereof, a complete example of operation will now be given based on the following assumed conditions: total number of terminals, 128; address designations, 7 bit binary; probability of service in response to any one enable required by any one terminal, 0.5%; network transmission or bit noise effective error rate, less than $10^{-1}$.

The central issues an ENABLE command with mask of 0000000 and an address field of XXXXXXX. For this special case of all zero's mask, any terminal may thereafter transmit any messages which are entered, as they are entered. For periods when the central has no messages to send, it repeats this enable sequence. When the central output buffer is filled with a message to send, the central sends that message.

As a further improvement on this method, in order to reduce the number of contentions actually created, when the central station detects a message arriving from a terminal, it disables all terminals not sending by apparatus which will now be described. This prevents any responses coming in from stations enabled but not having data immediately available, which obtain data to send while another station or stations is already sending data.

In FIG. 2, a disable command register 93 is shown which is connected via AND gate 94 to the contention latch 9 and to the message recieved signal line 6. Whenever a message is being received and contention occurs, AND gate 94 will be activated to turn on the disable command register 93 which will provide an output to the mode control 25. In FIG. 5, the mode control 15 is illustrated in greater detail and the controls for the disable command being sent are shown. With the concurrence of an input from AND gate 94 and the arrival of output data from disable command register 93, under prescribed conditions, AND gate 92 is enabled to supply the disable command out OR gate 87 to the remaining stations on the line in a full duplex mode of operation. The conditions required for this to occur are as follows. The indication that a message is being received and that the contention latch is reset activates AND gate 94 as stated earlier and this conditions one leg of AND gate 89 in FIG. 5. The other legs of AND gate 89 are conditioned by the output buffer 75 empty, the inversion of the not empty signal through the inverter 90, and from the all bits reset condition decoder 73 being on. AND gate 89 provides an output to AND gate 92 to condition its leg and allow the output of the disable command from register 93 through OR gate 87. At the same time, the output from AND gate 89 operates through OR gate 91 to inhibit transmission of the idle tone from the central. This condition also prevents transmission of partitioning enable command until the disable command has been transmitted.

Continuing now with the example of operation, it will be assumed that responses are received and enable commands are given in normal sequence.

Eventually, two or more terminals begin sending at the same time, or in such close relationship that the second does not receive the central disable command. The central detects a signal which fails to pass error detection requirements and is therefore interpreted by the detector as contention. In this example, four terminals, 1111011, 1100111, 1110011, and 0011111 are assumed to begin simultaneous sending, thereby causing contention.

The central sends a second cable enable sequence: ENABLE, 1000000, 0XXXXXX which causes all transmitting terminals to cease and enables all those with a zero in the first address position. Terminal 0011111 is re-enabled and transmits a message. The central then sends a third enable sequence, ENABLE, 1000000, 1XXXXXX, which enables all three of the remaining terminals. As soon as the central again detects a signal with error violations, it assumes that contention exists and sends: ENABLE, 1100000, 10XXXXX. Assuming that all terminals remain silent, the central sends: ENABLE, 1110000, 110XXXX. Assume that terminal 11001111 responds, and the other two remain silent. After reception of this second message, the central ceases partitioning and sends: ENABLE, 0000000, XXXXXXX. Terminals 1110011 and 0011111 , again contend, causing the central to transmit ENABLE, 1000000, 0XXXXXX which results in silence. Then the central sends: ENABLE, 1100000, 10XXXXX and again both terminals are silent. The central then sends: ENABLE, 1110000, 110XXXX which again elicits silence. The central therefore sends: ENABLE, 1111000, 1110XXX which causes terminal 1110011 to respond. After reception of the message, the central sends: ENABLE, 1111000 1111XXX which causes terminal 1111011 to respond. Since this is the second message since partitioning last began, the central resumes full enable by sending ENABLE, 0000000, XXXXXXX.

In a conventional polling system, a total of 128 poll seqences would be required of the central to elicit these four messages. For this method, this unlikely event (which has probability of approximately $7 \times 10^{-6}$ of occurring is resolved by transmission of eleven ENABLE sequences.

While it has been shown and described with reference to a preferred embodiment of the invention, it will be understood to those of skill in the art that various changes in form and detail may be made therein without departing from the spirit and scope of the invention.

What is claimed is:

1. A method of controlling individual access for the transmission of messages on a communications channel from a plurality of remote stations to a central station, all of which are mutually interconnected on said channel, comprising the steps of:

inviting responses simultaneously from a first plurality of said remote stations by signals sent from said central station on said channel;

receiving at said central station any of said responses so initiated by said invitation reaching any of said first plurality of remote stations which have messages to transmit at the time they are so invited or thereafter;

comparing said received responses, during the receipt thereof at said central station, with predetermined response format patterns to determine whether more than one said response is then being received in conflict with another said response; and re-inviting progressively smaller pluralities of said remote stations to respond simultaneously, whenever said conflict between responses is determined to exist, until a response is received without conflict, followed by beginning said inviting step anew.

2. The method of claim 1, wherein:

said beginning of said inviting step anew is commenced following the receipt of a plurality of responses individually and without conflict.

3. The method as described in claim 2, wherein:

said first plurality of remote stations comprises all of said remote stations; and said progressively smaller pluralities of said remote stations which are re-invited to respond are chosen from said first plurality.

4. The method as described in claim 3, wherein:

said smaller pluralities are chosen in groups of a size $N/2^i$ where N is the total number of said remote stations and $i$ is any integer, with N and $i$ chosen so that $1 \leq N/2^i \leq N$.

5. The method of claim 1, further comprising the step of: disabling all of said remote stations which are not then responding when said comparing step has determined that more than one said response is being received.

6. The method of claim 2, further comprising the step of: disabling all of said remote stations which are not then responding when said comparing step determines that more than one response is being received.

7. The method of claim 3, further comprising the step of: disabling all of said stations which are then responding when said comparing step determines that more than one response is being received.

8. The method of claim 4, further comprising the step of:

disabling all of said remote stations which are not then responding when said comparing step determines that more than one response is being received.

9. Apparatus for controlling individual access for the transmission of messages on a communications channel from the plurality of remote stations interconnected by said channel, comprising:

means for inviting responses simultaneously from a first plurality of said remote stations by signals sent from said central station on said channel;

means for receiving at said central station any of said responses so initiated by said invitation reaching any of said first plurality of remote stations which have messages to transmit at the time they are so invited;

means for comparing said received responses, during the receipt thereof at said central station, with predetermined response format patterns to determine whether more than one said response is then being received in conflict with another said response; and selection means, responsive to and connected to said means for comparing, for selecting progressively smaller pluralities of said remote stations and for controlling said inviting means to reinvite said selected pluralities to respond simultaneously, whenever said conflict between responses is determined to exist, until a response is received without conflict.

10. Apparatus as described in claim 9, wherein:

said means for inviting simultaneous responses from said central station on said network, comprises an address register means containing a plurality of address bits, some of which are held in common by said first plurality of remote stations, and means for transmitting said commonly held address bits on said channel, together with control signal bits, indicating which of said address bits are to be used, to initiate a response from all of said stations which have in common said indicated address bits contained in said address register;

said receiving means comprises an input register means, means for comparing received bits against standard formats contained in other registers, and means for signalling a true comparison between a plurality of received bits and the proper data message format contained in other registers so that valid received responses may be identified.

11. Apparatus as described in claim 10, wherein:

said selection means comprises, an address register means containing a multibit address having a plurality of bits shared in common with said first plurality of terminals, and means for incrementing said address bits to exclude larger and larger pluralities of said terminals from having corresponding bits, thereby narrowing to progressively smaller pluralities of said remote terminals which will be reinvited to respond.

12. Apparatus as described in claim 9, further comprising:

means for disabling all of said remote stations which are not then responding when said comparing step has determined that more than one response is being received.

13. Apparatus as described in claim 12, further comprising: means for disabling all of said remote stations which are then responding when said comparing step has determined that more than one response is being received.

14. Apparatus as described in claim 10, further comprising: means for disabling all of said remote stations which are not then responding when said comparing step has determined that more than one response is being received.

15. Apparatus as described in claim 11, further comprising:

means for disabling all of said remote stations which are not then responding when said comparing step has determined that more than one response is being received.

* * * * *

UNITED STATES PATENT AND TRADEMARK OFFICE

CERTIFICATE OF CORRECTION

PATENT NO. : 3,890,460

DATED : June 17, 1975

INVENTOR(S) : Lee C. Haas & Lynn P. West

It is certified that error appears in the above-identified patent and that said Letters Patent are hereby corrected as shown below:

Claim 9, Column 15, line 13, after "stations" insert --to a central station, all of which stations are mutually--;

Claim 9, Column 15, line 32, before "pluralities" insert --smaller--;

Signed and Sealed this

*ninth* Day of *December 1975*

[SEAL]

*Attest:*

RUTH C. MASON
*Attesting Officer*

C. MARSHALL DANN
*Commissioner of Patents and Trademarks*

Disclaimer 3,890,460.—*Lee C. Haas* and *Lynn Parker West*, Raleigh, N.C. COMMUNICATIONS ENABLING METHOD AND APPARATUS. Patent dated June 17, 1975. Disclaimer filed June 4, 1976, by the assignee, *International Business Machines Corporation, Inc.*

Hereby enters this disclaimer to claims 1 through 15 of said patent.

[*Official Gazette July 27, 1976.*]